US009942281B2

United States Patent
Laurila et al.

(10) Patent No.: US 9,942,281 B2
(45) Date of Patent: Apr. 10, 2018

(54) GROUP COMMUNICATION IN COMMUNICATION SYSTEM

(75) Inventors: Antti K. Laurila, Helsinki (FI); Miikka Poikselkä, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 11/285,107

(22) Filed: Nov. 23, 2005

(65) Prior Publication Data

US 2007/0073892 A1    Mar. 29, 2007

(30) Foreign Application Priority Data

Sep. 27, 2005 (FI) .................................. 20055514

(51) Int. Cl.
*H04L 29/06* (2006.01)
*H04L 12/18* (2006.01)
*H04W 76/00* (2018.01)

(52) U.S. Cl.
CPC ........ *H04L 65/1073* (2013.01); *H04L 12/185* (2013.01); *H04L 12/1818* (2013.01); *H04L 65/4061* (2013.01); *H04W 76/005* (2013.01); *H04L 65/1016* (2013.01)

(58) Field of Classification Search
CPC ......... H04L 45/02; H04L 41/12; H04L 45/00; H04L 45/04; H04L 43/12
USPC ....... 370/315, 341, 255, 390, 270, 432, 400, 370/352, 261, 389, 401, 348, 254, 395; 709/230, 204, 205, 203; 455/518, 519, 455/90, 522
See application file for complete search history.

(56) References Cited

U.S. PATENT DOCUMENTS

| | | | | |
|---|---|---|---|---|
| 6,006,253 A | * | 12/1999 | Kumar et al. | 709/204 |
| 6,163,692 A | * | 12/2000 | Chakrabarti et al. | 455/416 |
| 6,625,141 B1 | * | 9/2003 | Glitho et al. | 370/352 |
| 7,024,461 B1 | * | 4/2006 | Janning et al. | 709/207 |
| 7,027,652 B1 | * | 4/2006 | I'Anson | 382/218 |
| 7,508,767 B2 | * | 3/2009 | Shinomiya | 370/242 |
| 7,653,735 B2 | | 1/2010 | Mandato et al. | |
| 7,826,602 B1 | * | 11/2010 | Hunyady et al. | 379/93.09 |
| 7,898,990 B2 | * | 3/2011 | Kallio et al. | 370/261 |
| 8,180,722 B2 | * | 5/2012 | John et al. | 706/48 |

(Continued)

FOREIGN PATENT DOCUMENTS

| | | |
|---|---|---|
| EP | 090256 A1 | 3/1999 |
| EP | 0902569 A1 | 3/1999 |

(Continued)

OTHER PUBLICATIONS

International Search Report PCT/FI2006/050408 filed Sep. 26, 2006.

(Continued)

*Primary Examiner* — Hassan Phillips
*Assistant Examiner* — Prenell Jones
(74) *Attorney, Agent, or Firm* — Mintz Levin Cohn Ferris Glovsky and Popeo, P.C.

(57) ABSTRACT

In a communication system providing a group communication service and advertisement of an existing and newly created group, information on usable media types in the group is sent to group members in a message advertising the group. The message contains either a new field for the information or an existing field is extended to contain the information.

13 Claims, 3 Drawing Sheets

(56) References Cited

U.S. PATENT DOCUMENTS

| | | | |
|---|---|---|---|
| 9,009,231 B2* | 4/2015 | Poikselka | H04W 4/06 455/406 |
| 9,635,485 B2 | 4/2017 | Huotari et al. | |
| 2002/0165912 A1* | 11/2002 | Wenocur et al. | 709/203 |
| 2003/0005382 A1* | 1/2003 | Chen et al. | 714/748 |
| 2003/0007621 A1* | 1/2003 | Graves et al. | 379/219 |
| 2003/0014488 A1* | 1/2003 | Dalal et al. | 709/204 |
| 2003/0217109 A1* | 11/2003 | Ordille et al. | 709/206 |
| 2004/0052242 A1* | 3/2004 | Laturell | 370/352 |
| 2004/0057405 A1 | 3/2004 | Black | |
| 2004/0057449 A1* | 3/2004 | Black | 370/432 |
| 2004/0093433 A1* | 5/2004 | Armbruster et al. | 709/247 |
| 2004/0117804 A1* | 6/2004 | Scahill et al. | 719/320 |
| 2004/0190689 A1* | 9/2004 | Pelaez et al. | 379/88.13 |
| 2004/0202303 A1* | 10/2004 | Costa-Requena et al. | 379/205.01 |
| 2005/0053033 A1* | 3/2005 | Kelly et al. | 370/329 |
| 2005/0054361 A1* | 3/2005 | Turcanu et al. | 455/518 |
| 2005/0267936 A1* | 12/2005 | Poikselka | H04W 4/06 709/204 |
| 2005/0271041 A1* | 12/2005 | Minborg et al. | 370/352 |
| 2005/0287982 A1* | 12/2005 | Brewer et al. | 455/405 |
| 2006/0067252 A1* | 3/2006 | John et al. | 370/261 |
| 2006/0085417 A1* | 4/2006 | John et al. | 707/6 |
| 2006/0140173 A1* | 6/2006 | Hoover | 370/352 |
| 2006/0182129 A1* | 8/2006 | Mutch et al. | 370/401 |
| 2007/0115944 A1* | 5/2007 | Dantu et al. | 370/352 |
| 2007/0127505 A1* | 6/2007 | Laurila et al. | 370/400 |
| 2007/0288630 A1* | 12/2007 | De Noia et al. | 709/224 |

FOREIGN PATENT DOCUMENTS

| | | |
|---|---|---|
| JP | H09139759 A | 5/1997 |
| JP | H09186768 A | 7/1997 |
| JP | H11-110401 A | 4/1999 |
| JP | 2001274875 A | 10/2001 |
| JP | 2002-026980 A | 1/2002 |
| JP | 2002374350 A | 12/2002 |
| JP | 2004007482 A | 1/2004 |
| JP | 2004-537187 A | 12/2004 |
| WO | WO 01/67674 A2 | 9/2001 |
| WO | 2005/020598 * | 7/2004 |
| WO | WO 2005/060501 A2 | 7/2005 |
| WO | WO 2005/107156 A1 | 11/2005 |
| WO | 2006/006897 * | 1/2006 |

OTHER PUBLICATIONS

Translation of Non-Final Rejection dated Feb. 26, 2010, issued by the Korean Intellectual Property Office, in connection with counterpart Korean application No. 10-2008-7009771.

Second Office Action dated Jan. 29, 2010 issued by the State Intellectual Property Office in connection with counterpart Chinese application No. 200680035402.9.

English translation of the Second Office Action dated Jan. 29, 2010 issued by the State Intellectual Property Office in connection with counterpart Chinese application No. 200680035402.9.

Handley et al., "SDP: Session Description Protocol draft-ietf-mmusic-sap-00.txt", Jul. 16, 2005.

Kyung Ae Yoon et al., "Advertisement for Ad-hoc PoC Group", Retrieved from the Internet: <URL:ftp/Public_documents/COM/COM-POC/2004/>; Sep. 19, 2004.

Handley, "SAP: Session Announcement Protocol", Internet Draft, draft-ietf-mmusic-sap-00.txt, Internet Engineering Task Force, Nov. 19, 1996.

* cited by examiner

```
MESSAGE sip:summervacation@poc.home1.fr SIP/2.0
From: <sip:tobias@home1.fr>;tag=31415
To: <sip: summervacation@poc.home1.fr>
Accept-Contact: *;+g.poc.groupad;require;explicit
User-Agent: PoC-client/OMA1.0
Content-Type: application/vnd.poc.group-advertisement+xml
Content-Length: (482)

<?xml version="1.0" encoding="UTF-8"?>
<group-advertisement
xmlns="urn:oma:params:xml:ns:poc:group-advertisement"
xmlns:xsi="http://www.w3.org/2001/XMLSchema-instance"
xsi:schemaLocation="urn:oma:params:xml:ns:poc:group-advertisement">
<note>Tobias summer vacation planning</note>
<group type="dialed-in">
<display-name>Great trip to Finland</display-name>
<uri>sip-summervacation@poc.example.com</uri>
<communication-means="media_type1"; "media_type2">
</group>
</group-advertisement>
```

```
MESSAGE sip:summervacation@poc.home1.fr SIP/2.0
From: <sip:tobias@home1.fr>;tag=31415
To: <sip: summervacation@poc.home1.fr>
Accept-Contact: *;+g.poc.groupad;require;explicit
User-Agent: PoC-client/OMA1.0
Content-Type: application/vnd.poc.group-advertisement+xml
Content-Length: (482)

<?xml version="1.0" encoding="UTF-8"?>
<group-advertisement
xmlns="urn:oma:params:xml:ns:poc:group-advertisement"
xmlns:xsi="http://www.w3.org/2001/XMLSchema-instance"
xsi:schemaLocation="urn:oma:params:xml:ns:poc:group-advertisement">
<note>Tobias summer vacation planning</note>               — 3-1
<group type="dialed-in"; "media_type1"; "media_type2">
<display-name>Great trip to Finland</display-name>
<uri>sip-summervacation@poc.example.com</uri>              — 3-1'

</group>
</group-advertisement>
```

FIG. 3

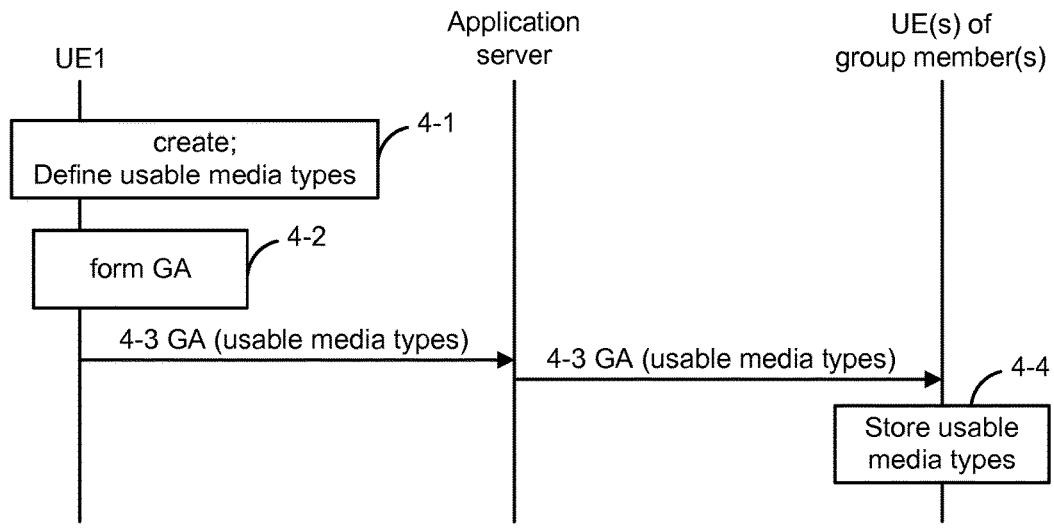

FIG. 4

GROUP COMMUNICATION IN COMMUNICATION SYSTEM

FIELD OF THE INVENTION

The present invention relates to group communication in communication systems providing a group communication service.

BACKGROUND OF THE INVENTION

One special feature offered in mobile communication systems is group communication. The term "group", as used herein, refers to any logical group of two or more users intended to participate in the same group communication. One example of group communication is a group call, which is a call in which all participants may take turns to speak and to listen to each other.

Conventionally, group communication has been available only in trunked mobile communication systems, such as Professional Mobile Radio or Private Mobile Radio (PMR) systems, such as TETRA (Terrestrial Trunked Radio), which are special radio systems primarily intended for professional and governmental users. Thanks to the evolution of communication technology, particularly IP-based communication technology, and end user equipment, a group communication service is now available also in public mobile communication systems. Examples of services providing group communication service include Push-to-talk over Cellular (PoC), messaging (IM), and conferencing, all implemented using primitives provided by SIP (Session Initiation Protocol) which is not vertically integrated into a communication system but a tool to build a multimedia architecture. Such group communication may include data calls, audio calls, video calls, multimedia calls, messaging, electronic mail, etc.

Due to the versatile communication possibilities, different media types can be usable in a group, such as a Voice PoC call, SIMPLE (SIP for Instant Messaging and Presence Leveraging Extensions) IM chat, Video PoC call and Gaming Service. However, for the time being no mechanism exist with which group members can be informed about usable media type(s) in a group. (A group member is a user intended to participate in the group communication.) Thus, group members have to guess the usable media type(s) in the group.

BRIEF DESCRIPTION OF THE INVENTION

An object of the present invention is thus to provide a method and an apparatus for implementing the method so as to overcome the above problem and to provide group members with information on usable media type(s) in a group. The object of the invention is achieved by a method, a signaling message, user equipment, a server and a computer program product which are characterized by what is stated in the independent claims. Preferred embodiments of the invention are disclosed in the dependent claims.

The invention is based on realizing the problem and solving it by enhancing a message informing group members about an existing group, called herein a message advertising a group, to contain a usable media type or usable media types in the group.

The present invention provides an easy-to-implement solution for informing group members about usable media types in the group. An advantage is that the user equipment, on the basis of the usable media type or types, knows which application it should use for communication in this group. A further advantage is that since the information is delivered in a message advertising a group, no extra signaling is needed and no resources need to be allocated to pass the information to intended group members.

BRIEF DESCRIPTION OF THE DRAWINGS

In the following, the invention will be described in greater detail by means of preferred embodiments and with reference to the accompanying drawings, in which

FIGS. 2 and 3 illustrate different group advertisement messages according to the invention; and FIG. 4 is a signaling diagram illustrating signaling according to an embodiment of the invention.

DETAILED DESCRIPTION OF SOME EMBODIMENTS

Figure 1:
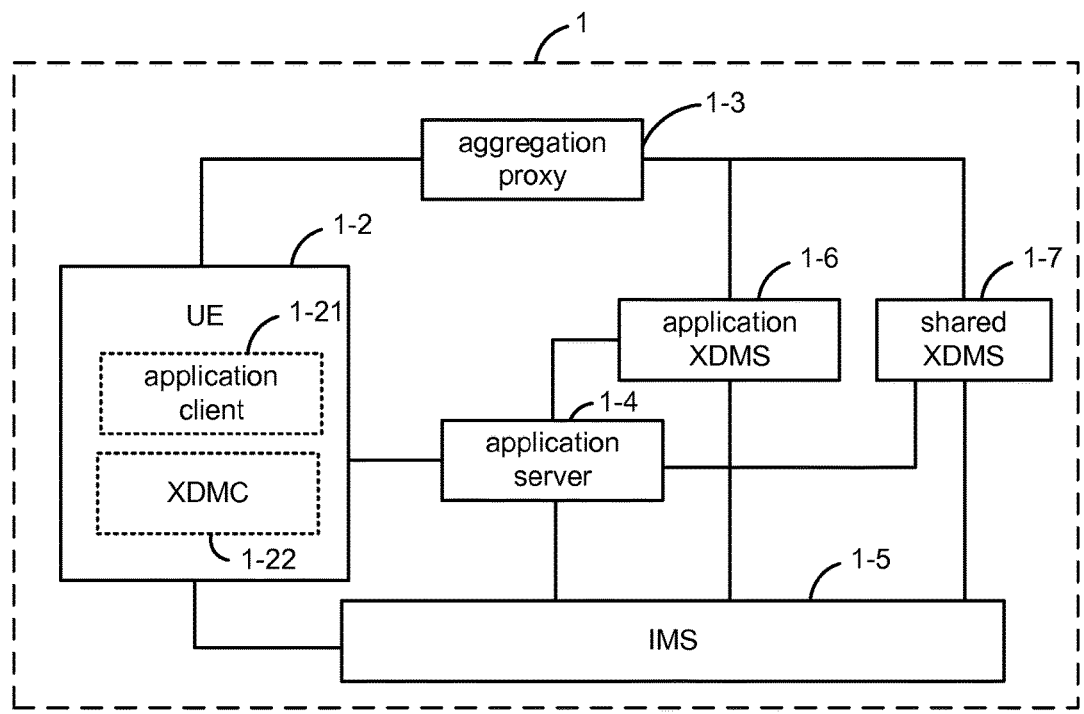
FIG. 1 illustrates an example of a general architecture of a communication system providing a group communication service.

The following embodiments are exemplary. Although the specification may refer to "an", "one", or "some" embodiment(s) in several locations, this does not necessarily mean that each such reference is made to the same embodiment(s), or that the feature only applies to a single embodiment. In addition, the embodiments presented below or parts thereof can be combined to produce preferred embodiments of the invention.

The present invention is applicable to any user equipment, servers and/or to any communication system or any combination of different communication systems that support group communication and provide(s) messages with which a group is advertised to group members. No limitations exist to the message format, nor to the group type. The communication system may be a fixed communication system or a wireless communication system or a communication system utilizing both fixed networks and wireless networks. The protocols used, the specifications of communication systems and user equipment, especially in wireless communication, develop rapidly. Such development may require extra changes to the invention. Therefore, all words and expressions should be interpreted broadly and they are intended to illustrate, not to restrict, the invention.

In the following, the present invention will be described using, as an example of a system architecture whereto the present invention may be applied, an architecture based on SIP providing a tool to build a multimedia architecture and utilizing XDM (XML Document Management) without restricting the invention to such an architecture, however. SIP is an Internet Engineering Task Force (IETF) defined application-layer control (signaling) protocol for creating, modifying, and terminating sessions with one or more participants. Open Mobile Alliance (OMA) has defined XDM as a generic framework for group and list management based on XCAP protocol (XML Configuration Access Protocol). IETF specifications and Internet Drafts can be found at http://www.ieff.org, and OMA specifications at http://www.openmobilealliance.org.

A general architecture of a communication system providing a group communication service utilizing SIP and XCAP is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication or for advertising a group, are irrelevant to the actual invention. Therefore, they need not to be discussed in more detail here. The present invention primarily relates to informing group members about usable media types in a group, the information being given in a message advertising the group.

The communication system 1 comprises user equipment (UE) 1-2, such as a mobile station, which is connectable to an aggregation proxy 1-3, application server 14 and to an IP Multimedia Subsystem (IMS) 1-5, and via them to an application XML Document Management Server (XDMS) 1-6 and a shared XDMS 1-7. As functional entities, UE 1-2 contains an application client 1-21 with which the service provided by the application is accessed, and an XML Document Management Client (XDMC) 1-22 with which XML documents, or an element/elements within an XML document, may be created, deleted, modified and retrieved, for example. Typically, control plane traffic, such as SIP signaling, passes through IMS 1-5 but user plane traffic passes between UE 1-2 and the application server 14. Group and list management traffic using the XCAP protocol goes between UE (or, more precisely, XDMC 1-22 in the UE) and the application XDMS 1-6 or the shared XDMS 1-7 via the aggregation proxy 1-3.

The aggregation proxy 1-3, application XDMS 1-6 and shared XDMS 1-7 are XDM functional entities. XDM defines a common mechanism that makes user-specific service-related information, such as group definitions, accessible to different applications (service enablers) and clients residing in user equipment, and enables creation, modification, retrieval and deletion of such information. The information, more precisely, XML documents, are stored in XDMSs. The application XDMS 1-6 is an application-specific server, i.e. it is serves one or more application servers, each for the same particular application, whereas the shared XDMC 1-7 serves application servers for different applications in the system and contains generic group and list management data. The aggregation proxy 1-3 routes an individual XCAP request from the XDMC to the correct XDMS.

The application providing the group communication service may be PoC, messaging, or conferencing, for example. PoC specification is currently being developed by a PoC working group under the OMA. More detailed information on the PoC can be found via the above-mentioned Internet pages of OMA. SIMPLE, defined by IETF, provides instant messaging (IM) service. OMA also defines IM (Instant Messaging) enabler based on SIP/SIMPLE protocols. Thus, the application server 4 may be a PoC server, an instant messaging server, or a conference server that supports different media types, such as audio, video and messaging. Since the application XDMS 1-6 serves a single application, the application XDMS 1-6 may be a PoC XDMS or instant messaging XDMS. For example, when the application is PoC, contact lists may be stored in the shared XDMS 1-7 and/or in the PoC XDMS, i.e. application XDMS 1-6, which contains PoC group documents. A PoC group document providing a member list for a PoC group session is thus accessible to UE 1-2 and to a PoC server, i.e. the application server 14, and they can utilize the member list when advertising the group or when establishing a group session (inviting group members to a group session). The PoC group document according to the invention preferably also contains usable media types in the group in addition to member list.

UE 1-2, or more specifically, the application client 1-21, allows, among other things, application session initiations and provides access to different group lists and contact lists. The application client according to the invention or the user equipment in which the application client resides may be configured to form and send messages advertising a group, add information on usable media types in a group to a message advertising the group, and to store the information on usable media types in the group, as illustrated in FIGS. 2 to 4. The application client according to the invention 1-21 may be shipped with the user equipment, or it may be a downloadable plug-in to the user equipment, otherwise later added to the user equipment, or an application client in the user equipment may be modified to be an application client according to the invention.

FIGS. 2 and 3 disclose messages according to the invention, both being messages advertising an existing group. The messages may be any suitable signaling messages but, for the sake of clarity, they are illustrated as a simplified SIP MESSAGE not containing, for the sake of clarity, all possible SIP headers and parameters. In the illustrated architecture, the messages are sent over IMS and they are immediate messages or page-mode messages. A feature common to those messages is that a message is created and sent to a recipient/recipients via network infrastructure and that a subsequent message is not related, at the protocol level, to the preceding one: each immediate or page-mode message, even a reply to a previous message, is considered to be an independent transaction. In other words, a message advertising a group is not a session-based messaging message but an independent transaction.

In the embodiment illustrated in FIG. 2, a message 2 contains a new field 'communication means' 2-1 to define usable media type(s) in this group, whereas in the embodiment illustrated in FIG. 3, the current field 'group type' is extended to define usable media type(s) 3-1, 3-1'. The new field 2-1 in FIG. 2 may also have another name. As regards the embodiment of FIG. 3, some other current field may be extended to define a usable media type. A media type covers here a general type of data and/or communication means which are negotiable between endpoints, i.e. UEs. Examples of media types include top-level media types defined by IETF in RFC 2046, Multipurpose Internet Mail Extensions (MIME) Part two: Media Types, November 1996. The top-level media types include, but are not limited to, text (textual information), image (image data), audio (audio data), video (video data), application (some other kind of data, typically either uninterpreted binary data or information to be processed by an application), multipart (data consisting of multiple entities of independent data types) and message (an encapsulated message). In addition, media types contain different sub-types and/or connection types (including different overlay services) providing group communication services. Thus, media types may be selected from the group of 'poc', 'im', 'audio', 'video', 'conference', 'application', 'all', 'other', for example.

In both illustrated examples, two media types, media_type1 and media_type2, are defined to be usable media types in the advertised group. However, there may be one, two, three or more usable media types in a group; the amount is unlimited. Preferably, the message contains all possible usable media types in the group since the usable media types only indicate what media types can be used in the group but they do not necessitate using media components of all usable media types in group communication. For example, if usable media types in a group are audio, video and messaging, it is possible that only audio is used during a group communication session of the group.

If a new usable media type is added to group definitions, or an existing usable media type is deleted from the group definitions, messages advertising the group are amended accordingly, and preferably sent after the amendment.

FIG. 4 illustrates signaling according to an embodiment of the invention. In the example illustrated in FIG. 4, it is assumed, for the sake of clarity, that group advertisement is activated and sent to all group members. An advantage of sending the message advertising the group to all group members is that each group member will have the same information on usable media types in the group. This enables the same user experience to all group members immediately. This is especially advantageous when usable media types are modified while a group exists.

In the illustrated example, the user equipment UE1, or more precisely, the user of UE1, creates, in point 4-1, a group using normal procedures. How the group is created bears no significance to the invention and therefore it is not discussed in detail here. In addition to prior art group definitions, the UE1 (the user) defines, in point 4-1, the usable media types for the created group. For example, the user equipment may show to the user all possible media types among which the user selects the ones he/she wishes to be usable with this group, or the user equipment may have a preset definition of usable media types, the preset definition being stored in the user equipment and used as a default. However, the details of how the usable media types are defined are irrelevant to the invention; it will suffice that usable media type(s) are added to the message advertising the group. When the group has been created and definitions are ready, the information on the group is forwarded by XDMC to the system and stored either in the application XDMS or in the shared XDMS using normal procedures. Then, either immediately or after a while, the UE1, or actually the application client in question in the UE1, forms, in point 4-2, a message advertising the group. The message either contains a new field (disclosed in FIG. 2) for usable media types or an extended field for group type (disclosed in FIG. 3). When the message is ready, the UE1 sends it (message 4-3) to the network. When the message arrives at the corresponding application server, it then preferably performs group advertisement policy and distribution checking using normal procedures. Then the application server delivers message 4-3 to the UEs of the group members (depending on the configuration, the UE1 receives or does not receive message 4-3).

When the UEs of the other group members (or the UE of another group member if the group only contains two members) receive message 4-3, they may store, in point 4-4, group information containing usable media type(s) to be used later with the group. The usable media type(s) may be shown to the user when the user wishes to invite other members to a group communication session, or when a user is responding to a group communication, for example.

The application server may be arranged to send messages advertising the group without receiving an advertisement from a group creator, the messages being sent to all group members or to a selected subset of the group members. Such an application server is illustrated in U.S. patent application Ser. No. 10/880,982 of the same applicant, which US patent application is incorporated herein by reference. (A corresponding PCT application is PCT/FI2005/050137). In embodiments in which the application server may also advertise the group, the application server is preferably also configured to send messages advertising the group member(s), including the creator, with information on the usable media types. In other words, the application server may send messages 4-3 to group members although the application server did not receive message 4-3.

In some other embodiment of the invention, messages advertising a group and containing information on usable media types may be sent without using the application server, i.e. the UE1 sends message 4-3 directly to other group members or to another group member.

The points and signaling messages shown in FIG. 4 are in no absolute chronological order, and some of the points/signaling may be performed simultaneously. Other functions can also be executed or other signaling messages sent between the points/signaling messages or within the points.

The user equipment, servers or corresponding server components and/or other corresponding devices implementing the functionality of the present invention comprise not only prior art means but also means for forming, sending and/or receiving messages advertising the group and containing information on usable media types in the group in the manner described above. Present servers and user equipment comprise processors and memory that can be utilized in the functions according to the invention. All modifications and configurations required for implementing the invention may be performed as routines, which may be implemented as added or updated software routines, application specific integrated circuits (ASIC) and/or programmable circuits. Software routines, also called program products, including applets and macros, can be stored in any device-readable data storage medium and they include program instructions to perform particular tasks. Software routines may be downloaded into a device.

It will be obvious to a person skilled in the art that, as technology advances, the inventive concept can be implemented in various ways. The invention and its embodiments are not limited to the examples described above but may vary within the scope of the claims.

The invention claimed is:
1. A method, comprising:
determining, by an extensible markup language document management server comprising at least one processor, that one or more parameters of a group of wireless devices has changed, the one or more parameters defined within a set of parameters in an extensible markup language document associated with the group;
advertising, by the extensible markup language document management server and based on the determining, at least a portion of the set of parameters by at least sending at least one message comprising one or more indications to at least one member of the group, the one or more indications regarding the at least the portion of the set of parameters,
wherein the at least one message is sent prior to initiation of a group call for the group, and
wherein the at least the portion of the set of parameters comprises one or more usable media types in the group call.
2. A method as claimed in claim 1 further comprising:
adding, by the extensible markup language document management server, the one or more indications to the at least one message,
wherein the group of wireless devices comprises a plurality of user equipment coupled via an internet protocol multimedia subsystem, and wherein the one or more usable media types includes all media types usable among the wireless devices of the group.

3. The method as in claim 1, wherein the message is sent to all members of the group, based on a list of all the members in the extensible markup language document associated with the group.

4. An apparatus, comprising:
at least one processor; and
at least one memory including code, which when executed by the at least one processor causes the apparatus to at least:
determine that one or more parameters of a group of wireless devices has changed, the one or more parameters defined within a set of parameters in an extensible markup language document associated with the group;
advertise, based on the determining, at least a portion of the set of parameters by sending at least one message comprising one or more indications to at least one member of the group, the one or more indications regarding the at least the portion of the set of parameters,
wherein the at least one message is sent prior to initiation of a group call for the group, and
wherein the at least the portion of the set of parameters comprises one or more usable media types in the group, wherein the apparatus comprises an extensible markup language document management server.

5. The apparatus as in claim 4, wherein the apparatus is further caused to at least:
add the one or more indications to the at least one message,
wherein the group of wireless devices comprises a plurality of user equipment coupled via an internet protocol multimedia subsystem, and
wherein the one or more usable media types includes all media types usable among the wireless devices of the group.

6. The apparatus as in claim 4, wherein the apparatus is further caused to at least:
add the one or more indications to an existing field in the at least one message.

7. The apparatus as in claim 4, wherein the one or more usable media types comprise one or more of:
push-to-talk over cellular,
instant messaging,
audio conferencing, and
video conferencing.

8. The apparatus as in claim 4, wherein the one or more usable media types indicated in the at least one message comprise all usable media types in the group.

9. A non-transitory computer-readable medium including a computer program, which when executed by at least one processor, causes operations comprising:
determining, by an extensible markup language document management server comprising at least one processor, that one or more parameters of a group of wireless devices has changed, the one or more parameters defined within a set of parameters in an extensible markup language document associated with the group;
advertising, by the extensible markup language document management server and based on the determining, at least a portion of the set of parameters by at least sending at least one message comprising one or more indications to at least one member of the group, the one or more indications regarding the at least the portion of the set of parameters,
wherein the at least one message is sent prior to initiation of a group call for the group, and
wherein the at least the portion of the set of parameters comprises one or more usable media types in the group call.

10. The non-transitory computer-readable medium of claim 1, wherein the operations further comprise:
adding, by the extensible markup language document management server, the one or more indications to the at least one message,
wherein the group of wireless devices comprises a plurality of user equipment coupled via an internet protocol multimedia subsystem, and
wherein the one or more usable media types includes all media types usable among the wireless devices of the group.

11. The method as in claim 1, wherein the one or more usable media types comprise:
push-to-talk over cellular,
instant messaging,
audio conferencing, and
video conferencing.

12. The method as in claim 1, wherein the one or more usable media types indicated in the at least one message comprise all usable media types in the group.

13. The method of claim 1, further comprising:
storing, at the extensible markup language document management server, the extensible markup language document associated with the group; and
monitoring, at the extensible markup language document management server, the extensible markup language document associated with the group to determine whether there is a change to usable media types in the group.

* * * * *